United States Patent
Amlin

(10) Patent No.: US 6,854,321 B2
(45) Date of Patent: Feb. 15, 2005

(54) TEMPERATURE, VAPOR SPACE AND FUEL VOLATILITY-COMPENSATED EVAPORATIVE EMISSIONS SYSTEM LEAK TEST METHOD

(75) Inventor: David J. Amlin, Sacramento, CA (US)

(73) Assignee: State of California, Bureau of Automotive Repair, Sacramento, CA (US)

( * ) Notice: Subject to any disclaimer, the term of this patent is extended or adjusted under 35 U.S.C. 154(b) by 20 days.

(21) Appl. No.: 10/608,840

(22) Filed: Jun. 30, 2003

(65) Prior Publication Data

US 2004/0261506 A1 Dec. 30, 2004

(51) Int. Cl.$^7$ .............................................. G01M 3/04
(52) U.S. Cl. ........................................ 73/49.7; 702/51
(58) Field of Search ............................... 73/40, 40.5 R, 73/49.7, 118.1; 123/518, 520; 702/51

(56) References Cited

U.S. PATENT DOCUMENTS

| | | | | | |
|---|---|---|---|---|---|
| 5,146,902 | A | * | 9/1992 | Cook et al. | 123/518 |
| 5,297,529 | A | * | 3/1994 | Cook et al. | 123/520 |
| 5,299,545 | A | * | 4/1994 | Kuroda et al. | 123/520 |
| 5,878,727 | A | * | 3/1999 | Huls | 123/520 |
| 5,884,610 | A | * | 3/1999 | Reddy | 123/520 |
| 6,164,123 | A | * | 12/2000 | Corkill | 73/49.7 |
| 6,679,302 | B1 | * | 1/2004 | Mattingly et al. | 141/104 |

FOREIGN PATENT DOCUMENTS

| | | | | | |
|---|---|---|---|---|---|
| JP | 05044532 | A | * | 2/1993 | F02D/41/10 |
| JP | 05112399 | A | * | 5/1993 | B67D/5/32 |

* cited by examiner

Primary Examiner—Charles D. Garber

(57) ABSTRACT

A method for the leak testing of a motor vehicle fuel tank and associated evaporative emissions control system is provided. Nitrogen, compressed air or other gases are used to pressurize the system. The time required for pressurization is used to determine the tank headspace volume. The system pressure is then monitored for 120 seconds. The pressure drop in this period is then compared with a pass-fail value cutpoint from a look-up table stored in a computer attached to the testing apparatus. A pass-fail determination is then made. The pass-fail value cutpoint is pre-determined for a specified vapor volume and estimated liquid fuel temperature, as well as time of year, so that systems with leaks larger than a specified diameter consistently fail the test, while systems with leaks smaller than this value consistently pass the test. The test pass-fail criterion is thus compensated for the conditions (tank fill level and fuel temperature, and seasonal variations in fuel volatility) experienced the actual test.

1 Claim, 1 Drawing Sheet

Schematic of a Vehicle Fuel and Evaporative System

Diagram courtesy of California Air Resources Board

Schematic of a Vehicle Fuel and Evaporative System
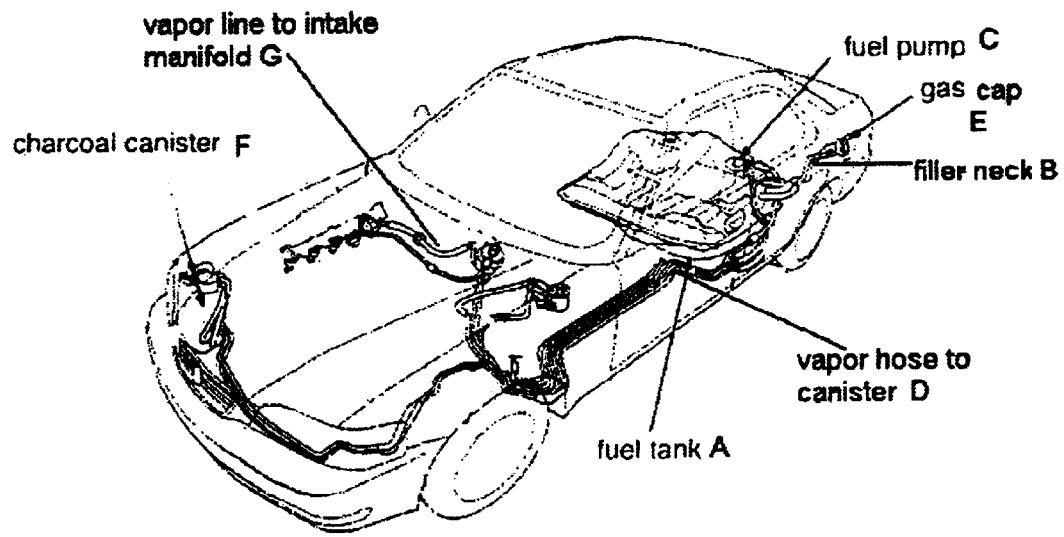
Diagram courtesy of California Air Resources Board

TEMPERATURE, VAPOR SPACE AND FUEL VOLATILITY-COMPENSATED EVAPORATIVE EMISSIONS SYSTEM LEAK TEST METHOD

BACKGROUND OF THE INVENTION

1. Field of the Invention

The invention relates to the leak testing of automotive vehicle fuel tanks and associated evaporative emissions control systems. More particularly it relates to a method for testing such systems which corrects for a fundamental problem with previous methods: the lack of compensation for variations in the test conditions of liquid fuel temperature and volatility.

2. Background Information

Several previous inventions have dealt with the problem of leak detection from automotive fuel tanks and associated evaporative emissions control systems. Rogers, in U.S. Pat. No. 5,369,984, described a method for "testing of tank integrity of vehicle fuel systems." Fournier, in U.S. Pat. No. 5,425,266, detailed an apparatus and method for the "non-intrusive testing" of such systems, employing an annular device to produce a seal between a pressure control unit and the fuel tank filler neck into which the pressure control unit was inserted. Kammeraad et al., in U.S. Pat. No. 5,507,176, described a tester utilizing an adapter fitting onto the access port for filling of the fuel tank, which allows the fuel cap to be tested in tandem with the rest of the evaporative system. Kolb, in U.S. Pat. No. 5,509,296, described a system for applying pressure to a fuel tank by placing a sleeve over the fuel tank filler neck. Chirco et al., in U.S. Pat. No. 5,644,072, described a system of pressure regulators and pressure sensors for pressurizing and measuring the pressure decay of a fuel tank. Lycan et al., in U.S. Pat. No. 6,289,722, described a helium leak tester for vehicle fuel tanks, intended for use in finding small leaks in fuel tanks prior to their installation in motor vehicles. Harris, in U.S. Pat. No. 6,327,898, described a system employing a device measuring differences in pressure from the evaporative system and the outside environment, in order to generate a pass-fail decision.

All of the above inventions involve some variant of the basic procedure of pressurizing a fuel tank and observing the resulting pressure decay to make a pass-fail determination—i.e., does the system have a leak sufficiently large that repair is necessary. A basic problem with all of the above inventions is that these tests do not consider all of the considerable variation in fuel temperature and volatility under which the vehicle is leak-tested, which can strongly influence the test results. High-temperature or high-volatility fuel is prone to sudden changes in fuel vapor pressure due to the increased vaporization rate of the fuel; these changes can impair or mask entirely the ordinary release of pressure through a leak. Thus, if the pass-fail decision cutpoint is not compensated for these variables, a problem arises: a vehicle with a given size leak may pass one test and fail another, due to differences in test conditions (irrespective of any repair). Such an outcome is most unfavorable in a governmental regulatory environment, where such tests need to produce reliable, consistent outcomes.

BRIEF SUMMARY OF THE INVENTION

The substance of the claimed invention is the use of a process containing pre-determined tables (as command input to the pressurization machine) correlating pass-fail decision pressure drop cutpoints with estimated fuel temperature, and time of year (determining fuel volatility). As stated previously, this results in a test which gives consistent, repeatable results despite changes in these test conditions, for a given vehicle.

DETAILED DESCRIPTION OF THE INVENTION

Attached in FIG. 1 is a schematic diagram of a vehicle fuel tank and associated evaporative emissions control system. The fuel tank (marked A) contains several openings, all ordinarily sealed: one at the fuel tank filler neck (B), one at the mounting housing for the fuel pump (C), one at the inlet to the vapor hose to the canister (D), and a rollover valve (not shown). Some vehicles may contain openings additional to these. The evaporative emissions control system is comprised of these seals, as well as several other components: the fuel cap (E), an elastomeric rubber connector from the filler neck (B) to the fuel tank (A), a charcoal canister (F), and a vapor hose (G) connecting the canister to the engine intake manifold. In general, the operation of the system is as follows: During vehicle operation, the fuel in fuel tank A is heated by the return of hot fuel from the engine and from ambient sources, such as hot pavement. This heating causes vapor generation in fuel tank A; this vapor is directed via the vapor hose D to the canister, which stores the fuel vapor until it is drawn into the engine intake manifold H and consumed by the engine. During parked episodes, when the fuel tank is heated by ambient influences, the vapor generated is simply routed to the canister for storage, prior to consumption by the engine. The evaporative canister contains a fresh-air vent through which air is drawn during "purging", or consumption of fuel vapor by the engine. Vapor beyond the storage capacity of the canister is allowed to exit the system into the environment through the fresh-air vent. Clearly, if there is a leak in the evaporative system anywhere between the fuel tank and the evaporative canister, fuel vapor will be released into the environment, contributing to air pollution.

The subject invention is designed to diagnose such evaporative system leaks. Upon input of vehicle identification information into the computer, the test begins with an estimation of liquid fuel temperature (based upon ambient fuel temperature), followed by an entering of this value into the computer. An adapter is then attached to the fuel tank filler neck (after removal of the fuel cap); this adapter will be used for system pressurization. The fuel vapor hose leading from the fuel tank to the evaporative canister is then pinched off. This is done because the evaporative canister necessarily contains a vent to the atmosphere, whose plugging is inconvenient. The pinching off of the vapor line allows the system to be pressurized.

Following the above steps, the ambient temperature and pressure are then recorded. Following this step and a venting of the evaporative system (to ensure it is at atmospheric pressure), the system is then pressurized to 14 inches of water pressure, or approximately 0.45 pounds per square inch. The pressurization is performed using either nitrogen, compressed air, or other gases. If the pressure fails to stabilize, the vehicle may be re-pressurized, but this re-pressurization may only occur once; otherwise, if the pressure does not stabilize the vehicle is presumed to contain a leak so large that the system will not hold pressure, and the vehicle is failed.

Once the pressure has stabilized at 14 inches of water, the computer calculates the vapor volume present in the tank, based on the time required to fill the headspace with nitrogen, and the estimated temperature of the fuel. The fuel temperature has an important, albeit indirect, effect on the time required to pressurize the system. Pressurization using recently decompressed nitrogen introduces cold nitrogen into the fuel tank headspace. This cools the fuel vapor during pressurization, causing condensation, so that additional nitrogen is required to reach the 14 inches of water threshold. The amount of vapor condensation increases strongly with fuel volatility and thus with fuel temperature. Systems without adequate compensation for fuel temperature risk inaccurate determination of fuel vapor volume and hence inappropriate decision cutpoint pressure drops.

Once the tank vapor volume, or headspace, is logged, the actual pressure decay test begins. The pressure in the tank is monitored for 120 seconds, with the final pressure recorded and the total pressure drop compared with a value from a look-up table in the computer memory. This value is selected from the table based upon the time of year, the computed tank vapor volume, and the estimated fuel temperature. If the pressure drop exceeds the appropriate value, the vehicle is recorded as failing the test; otherwise, the vehicle passes. Once the test is over, any residual pressure in the system is vented.

The following is a sample table presenting correlations between measured fuel temperature, the pressurization time required, the inferred tank vapor volume, and the pass-fail decision cutpoint for a leak threshold of 0.0205" diameter. Each table is for use during a specified interval of the year: summertime, wintertime, or the "transition" season between summer and winter. The tables are divided by time of year because the volatility of gasoline, and hence its response to ambient heatloads, varies greatly by season. In California the vapor pressure of gasoline at 100° F., also known as Reid Vapor Pressure (RVP), varies from approximately 7 pounds per square inch (psi) during the summer months to as much as 12 psi during the winter months, depending on location in the State. High fuel volatility correlates strongly with fuel pressure spikes during and immediately following pressurization of the system, decreasing the pressure drop observed.

TABLE

Wintertime Fuel

| Temperature (° F.) | Time to fill (14" H$_2$O) | Vapor Space (Gallons) | Max. Pressure Decay ("H$_2$O) |
|---|---|---|---|
| 60 | 8.7 | 0.529 | 12.0 |
| 60 | 11.0 | 1.057 | 12.0 |
| 60 | 13.2 | 1.586 | 12.0 |
| 60 | 15.5 | 2.114 | 12.0 |
| 60 | 17.8 | 2.643 | 12.0 |
| 60 | 20.0 | 3.171 | 12.0 |
| 60 | 22.3 | 3.700 | 11.8 |
| 60 | 24.6 | 4.228 | 11.3 |
| 60 | 26.8 | 4.757 | 10.9 |
| 60 | 29.1 | 5.285 | 10.4 |
| 60 | 31.4 | 5.814 | 10.0 |
| 60 | 33.6 | 6.342 | 9.6 |
| 60 | 35.9 | 6.871 | 9.2 |
| 60 | 38.2 | 7.399 | 8.9 |
| 60 | 40.5 | 7.928 | 8.5 |
| 60 | 42.7 | 8.456 | 8.2 |
| 60 | 45.0 | 8.985 | 7.8 |
| 60 | 47.3 | 9.513 | 7.5 |
| 60 | 49.5 | 10.042 | 7.2 |
| 60 | 51.8 | 10.570 | 6.9 |
| 60 | 54.1 | 11.099 | 6.7 |
| 60 | 56.3 | 11.627 | 6.4 |
| 60 | 58.6 | 12.156 | 6.1 |

TABLE-continued

Wintertime Fuel

| Temperature (° F.) | Time to fill (14" H$_2$O) | Vapor Space (Gallons) | Max. Pressure Decay ("H$_2$O) |
|---|---|---|---|
| 60 | 60.9 | 12.684 | 5.9 |
| 60 | 63.1 | 13.213 | 5.6 |
| 60 | 65.4 | 13.741 | 5.4 |
| 60 | 66.5 | 14.000 | 5.3 |
| 60 | 70.8 | 15.000 | 5.0 |
| 60 | 75.1 | 16.000 | 4.7 |
| 60 | 79.4 | 17.000 | 4.4 |
| 60 | 83.7 | 18.000 | 4.1 |
| 60 | 88.0 | 19.000 | 3.9 |
| 60 | 92.3 | 20.000 | 3.7 |
| 60 | 96.6 | 21.000 | 3.6 |
| 60 | 100.9 | 22.000 | 3.4 |
| 60 | 105.2 | 23.000 | 3.2 |
| 60 | 109.5 | 24.000 | 3.1 |
| 60 | 113.7 | 25.000 | 3.0 |
| 60 | 118.0 | 26.000 | 2.9 |
| 60 | 122.3 | 27.000 | 2.8 |
| 60 | 126.6 | 28.000 | 2.7 |
| 60 | 130.9 | 29.000 | 2.6 |
| 60 | 135.2 | 30.000 | 2.5 |

Fuel vapor pressure is also strongly dependent on fuel temperature. A summer fuel, for instance, may have a vapor pressure of 13 psi at 120° F. fuel temperature, but 4 psi or less at 60° F. Both fuel temperatures are experienced during the summer months in California, with 120° F. being a possible tank temperature at the completion of an hour-long drive during a 95° F. day, and 60° F. occurring at the beginning of a drive during a 55° F. morning. It is for these reasons that the attached tables are also indexed by estimated fuel temperature. Estimated fuel temperatures outside the range of temperatures explicitly covered by the tables are taken as occurring at the appropriate endpoint temperature. The liquid fuel temperature is estimated by using the measured ambient temperature at the time of testing, and then adding to this number a pre-determined value known (based upon previous field testing) to provide the best correlation of estimated fuel temperature with actual fuel temperature.

The pass-fail cutpoints are the result of extensive laboratory testing with representative fuels, using a procedure substantially similar to that to be used in actual in-use testing. The procedure used in the laboratory testing entails a pressurization using recently compressed nitrogen. As this nitrogen decompresses prior to introduction into the vehicle fuel tank, it attains a cold temperature. The introduction of this cold gas into the warm fuel tank causes a condensation of the fuel vapor into fuel liquid. It is the compensatory re-heating of this vapor by the liquid fuel (whose temperature remains largely unchanged) that causes the pressure spikes described earlier. These tables are thus most accurate for pressurization tests using decompressed nitrogen. However, the scope of the test method described in this application also extends to pressurization procedures using compressed air, or other gases. The scope should also be understood to apply to the use of tables incorporating a different leak threshold diameter. Finally, the scope should be understood to apply to revised tables for use when compressed air, or other means, is being used for pressurization.

What is claimed is:

1. A method for leak-testing a motor vehicle fuel tank and associated evaporative emissions control system, comprising:

the use of a pressure regulator system, comprised of orifices attached to a nitrogen or compressed air source, to deliver gas from such source at a specified pressure measured by a pressure transducer, to the evaporative emissions system of a gasoline-powered motor vehicle until the pressure of such system is approximately 14 inches of water (about 0.45 pounds per square inch) above atmospheric pressure;

the use of look-up tables to determine an appropriate pass-fail decision cutpoint, based on measured drop in tank pressure over a 120-second period, such tables incorporating the estimated liquid fuel temperature, and time of year (affecting fuel volatility) into the decision cutpoint;

the use of decision-tree logic to determine whether a vehicle has a leak sufficiently large that pressurization is impossible and the vehicle is deemed to fail the test;

the use of an electronic interface between the pressurization device and an on-line computer system which issues commands for the effective control of the pressurization device.

* * * * *